(12) United States Patent
Druyan et al.

(10) Patent No.: US 8,453,152 B2
(45) Date of Patent: May 28, 2013

(54) WORKFLOW CONTROL OF RESERVATIONS AND REGULAR JOBS USING A FLEXIBLE JOB SCHEDULER

(75) Inventors: Alexander Druyan, New York, NY (US); Wei Li, Beijing (CN); Kailash N. Marthi, Poughkeepsie, NY (US); Yun T. Xiang, Beijing (CN); Linda C. Cham, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 13/018,796

(22) Filed: Feb. 1, 2011

(65) Prior Publication Data

US 2012/0198462 A1 Aug. 2, 2012

(51) Int. Cl.
*G06F 9/46* (2006.01)

(52) U.S. Cl.
USPC ............. 718/103; 718/102; 718/104; 712/28; 712/29; 712/30; 712/31

(58) Field of Classification Search
None
See application file for complete search history.

(56) References Cited

U.S. PATENT DOCUMENTS

| | | | |
|---|---|---|---|
| 7,620,706 B2 | 11/2009 | Jackson | |
| 7,716,336 B2 | 5/2010 | Coppinger et al. | |
| 7,725,583 B2 | 5/2010 | Jackson | |
| 7,752,622 B1 | 7/2010 | Markov | |
| 2004/0215780 A1 | 10/2004 | Kawato | |
| 2007/0022425 A1* | 1/2007 | Jackson | 718/104 |
| 2007/0256078 A1* | 11/2007 | Falk et al. | 718/104 |
| 2008/0066070 A1 | 3/2008 | Markov | |
| 2009/0113434 A1 | 4/2009 | Podila | |

OTHER PUBLICATIONS

U.S. Appl. No. 13/450,401, filed Apr. 18, 2012, Alexander Druyan et al, International Business Machines Corporation, 37 pages.
Elleithy et al, "Optimization and Job Scheduling in Heterogenous Networks", Computer Science and Engineering Department University of Bridgeport, CT, USA, 6 pages, accessed online as of Jan. 25, 2011 from <http://docs.google.com/viewer?a=v& q= cache: NmJhSIWVLzoJ:www1bpt.bridgeport.edu/~elleithy/Conferences/ C14_Optimization% 2520and%2520 Job% 2520 Scheduling% 2520in HetrogeneousNetworks.pdf+ Optimization+ and+ Job+ Scheduling& hl=en&gl=us&pid=bl& srcid= ADGEESifa JQUIEKq3 Pe4uz_TOevN0IMN-.

(Continued)

*Primary Examiner* — Emerson Puente
*Assistant Examiner* — Sisley Kim
(74) *Attorney, Agent, or Firm* — Matthew W. Baca; Amy J. Pattillo (57) ABSTRACT

A scheduler receives at least one flexible reservation request for scheduling in a computing environment comprising consumable resources. The flexible reservation request specifies a duration and at least one required resource. The consumable resources comprise at least one machine resource and at least one floating resource. The scheduler creates a flexible job for the at least one flexible reservation request and places the flexible job in a prioritized job queue for scheduling, wherein the flexible job is prioritizes relative to at least one regular job in the prioritized job queue. The scheduler adds a reservation set to a waiting state for the at least one flexible reservation request. The scheduler, responsive to detecting the flexible job positioned in the prioritized job queue for scheduling next and detecting a selection of consumable resources available to match the at least one required resource for the duration, transfers the selection of consumable resources to the reservation and sets the reservation to an active state, wherein the reservation is activated as the selection of consumable resources become available and has uninterrupted use of the selection of consumable resources for the duration by at least one job bound to the flexible reservation.

8 Claims, 5 Drawing Sheets

OTHER PUBLICATIONS

Non-Final Office Action, U.S. Appl. No. 13/450,401, filed Apr. 18, 2012, Alexander Druyan et al, International Business Machines Corporation, mailing date Jul. 26, 2012, 56 pages.

Notice of Allowance, U.S. Appl. No. 13/450,401, filed Apr. 18, 2012, Alexander Druyan et al, International Business Machines Corporation, mailing date Jan. 14, 2013, 36 pages.

* cited by examiner

WORKFLOW CONTROL OF RESERVATIONS AND REGULAR JOBS USING A FLEXIBLE JOB SCHEDULER

This invention was made with United States Government support under HR0011-07-9-0002 awarded by DARPA. The Government has certain rights in the invention.

BACKGROUND

1. Technical Field

This invention relates in general to managing workflow in consumable resources using a job scheduler and more particularly, to workflow control of flexible reservations for scheduling a reservation for uninterrupted use of a selection of consumable resources for specified duration of time by jobs bound to the reservation, as the selection of consumable resources become available, wherein the flexible reservations are prioritized relative to regular jobs and other workflow.

2. Description of the Related Art

Computing environments comprising one or more machines, viewed as a cluster, grid, or other type of distributed computing environment, are typically managed by at least one scheduler. The scheduler manages the flow of jobs to machine resources, such as processors, memory, and disk drives. As the popularity of distributed computing environments increases, these environments become busier and management of the workload on the machine resources increases in complexity. Poor management of a the use of machine resources within a distributed computing environment increases the likelihood that some machine resources may remain unused while jobs are also left unprocessed or rejected, the jobs that are processed experience delays, and the unnecessary addition of temporary or additional permanent machine resources to the distributed computing environment.

In addition, within a distributed computing environment, the available consumable resources may also include shared, floating resources such as software licenses and network bandwidth. Poor management of floating resources within a distributed computing environment increases the likelihood that jobs will unnecessarily compete for floating resources and that jobs already dispatched to machine resources for running, also needing floating resources to execute, will stall while waiting for other jobs to finish with and release floating resources.

BRIEF SUMMARY

In view of the foregoing, there is a need for efficiently managing workflow to all consumable resources of a distributed computing environment, including both machine resources and floating resources, using a job scheduler. In particular, there is a need for a job scheduler for controlling workflow of and prioritizing both regular jobs for dispatch to consumable resources and reservation requests for reservations of resources for uninterrupted use for a duration of time by jobs bound to the reservations.

According to one embodiment of the invention, a system for managing workflow, comprises a scheduler operative to schedule use of a computing environment comprising a plurality of consumable resources comprising at least one machine resource and at least one floating resource. The system comprises the scheduler operative to receive at least one flexible reservation request for scheduling in the computing environment, wherein the flexible reservation request specifies a duration and at least one required resource. The system comprises the scheduler operative to create a flexible job for the at least one flexible reservation request and placing the flexible job in a prioritized job queue for scheduling. The system comprises the scheduler operative to add a reservation set to a waiting state for the at least one flexible reservation request. The system comprises the scheduler, responsive to detecting the flexible job positioned in the prioritized job queue for scheduling next and detecting a selection of the plurality of consumable resources available to match the at least one required resource for the duration, operative to transfer the selection of the plurality of consumable resources to the reservation and setting the reservation to an active state, wherein the reservation is activated as the selection of the plurality of consumable resources become available and has uninterrupted use of the selection of the plurality of consumable resources for the duration for at least one bound job to the flexible reservation.

According to another embodiment, a computer program product for managing workflow is tangibly embodied in a computer-readable storage medium and comprises computer executable instructions which cause a computer to receive, by a scheduler, at least one flexible reservation request for scheduling in a computing environment comprising a plurality of consumable resources, wherein the flexible reservation request specifies a duration and at least one required resource and wherein the plurality of consumable resources comprises at least one machine resource and at least one floating resource. The computer program product comprises computer executable instructions which cause the computer to create, by the scheduler, a flexible job for the at least one flexible reservation request and placing the flexible job in a prioritized job queue for scheduling. The computer program product comprises computer executable instructions which cause the computer to add a reservation set to a waiting state for the at least one flexible reservation request. The computer program product comprises computer executable instructions which cause the computer, responsive to detecting the flexible job positioned in the prioritized job queue for scheduling next and detecting a selection of the plurality of consumable resources available to match the at least one required resource for the duration, to transfer the selection of the plurality of consumable resources to the reservation and setting the reservation to an active state, wherein the reservation is activated as the selection of the plurality of consumable resources become available and has uninterrupted use of the selection of the plurality of consumable resources for the duration for at least one bound job to the flexible reservation.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
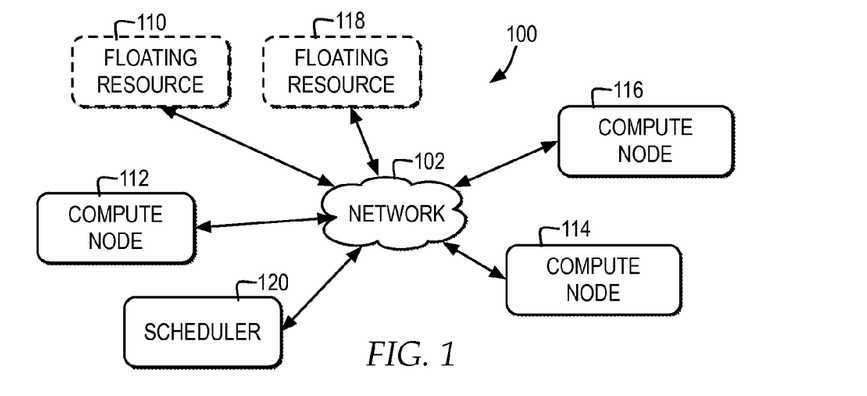
FIG. 1 is a block diagram illustrating a computing environment in which consumable resources are arranged in various configurations and communicatively connected.

FIG. 1 illustrates a block diagram of a computing environment in which consumable resources are arranged in various configurations and communicatively connected. In the example, a computing environment 100 includes multiple consumable resources, illustrated as compute nodes 112, 114, and 116, floating resources 110 and 118, and a scheduler 120, communicatively connected via a network 102. Computing environment 100 may represent multiple types and levels of consumable resources configured in a distributed computing environment, a cluster computing environment, a grid environment or other network environment including multiple computing nodes. In one example, computing environment 100 is configured in a cluster and scheduler 120 controls workflow of jobs on compute nodes 112, 114, and 116 by scheduling and dispatching jobs to run on one or more of compute nodes 112, 114, and 116 and floating resources 110 and 118. Those of ordinary skill in the art will appreciate that the number of compute nodes, the number of floating resources, and the number of networks connecting consumable resources within computing environment 100 may vary.

In the example of computing environment 100, each of compute nodes 112, 114, and 116 represent one or more resources managed as a compute node by a scheduler, such as scheduler 120. In one example, compute nodes 112, 114, and 116 each include one or more machine resources, where machine resources include, but are limited to, processors, disk drives, memory, and communication adapters.

In addition, in the example of computing environment 100, each of floating resources 110 and 118 represent one or more shared resources specified within a shared resource set for computing environment 100. In one example, the configuration of resources within computing environment 100 in a cluster managed by scheduler 120 includes the shared resource set illustrated by floating resources 110 and 118. In one example, floating resources 110 and 118 include, but are not limited to, disk quotas for staging data, computational network bandwidth, input/output (I/O) network bandwidth, tokens, software licenses, and other on-demand resources shareable between compute nodes.

In the example, floating resources 110 and 118 may be moved from one compute node to another compute node within computing environment 100. For example, floating resource 110 may include a software resource assigned to computing node 114 for use by a first job and moved to computing node 116 for use by a second job. In one example, scheduler 120 may manage the movement of floating resources 110 and 118 from one compute node from among compute nodes 112, 114, and 116 to another compute node from among compute nodes 112, 114, and 116.

In the example, scheduler 120 may be implemented on a client system, server, addition compute node, or other system, or may be implemented within one or more layers distributed across multiple compute nodes include, but not limited to, compute nodes 112, 114, and 116. Scheduler 120 may control workflow by scheduling one or more of advance reservations for uninterrupted use of consumable resources at a user specified start time by jobs bound to the reservation, as further described with reference to FIG. 2, regular jobs not bound to a reservation, as further described with reference to FIG. 3, and flexible reservations scheduled as resources become available and regular reservation-less jobs, as further described with reference to FIG. 4. As will be further described with reference to FIG. 4, when scheduler 120 operates as a flexible scheduler, scheduler 120 automates the workflow on consumable resources as resources become available and prioritizes reservations and other workload relative to one another to more efficiently use all available consumable resources.

Network 102 may include, but is not limited to, packet-switching networks, such as the Internet or an intranet, and telephony networks. In addition, network 102 may include routers, switches, gateways, and other hardware to enable direct and indirect communication channels between each of compute nodes 112, 114, and 116, floating resources 110 and 118, and scheduler 120. In addition, one of ordinary skill in the art may appreciate that additional functional components, such as resource managers and other layers and elements required for managing computing environment 100, may be implemented.

Figure 2:
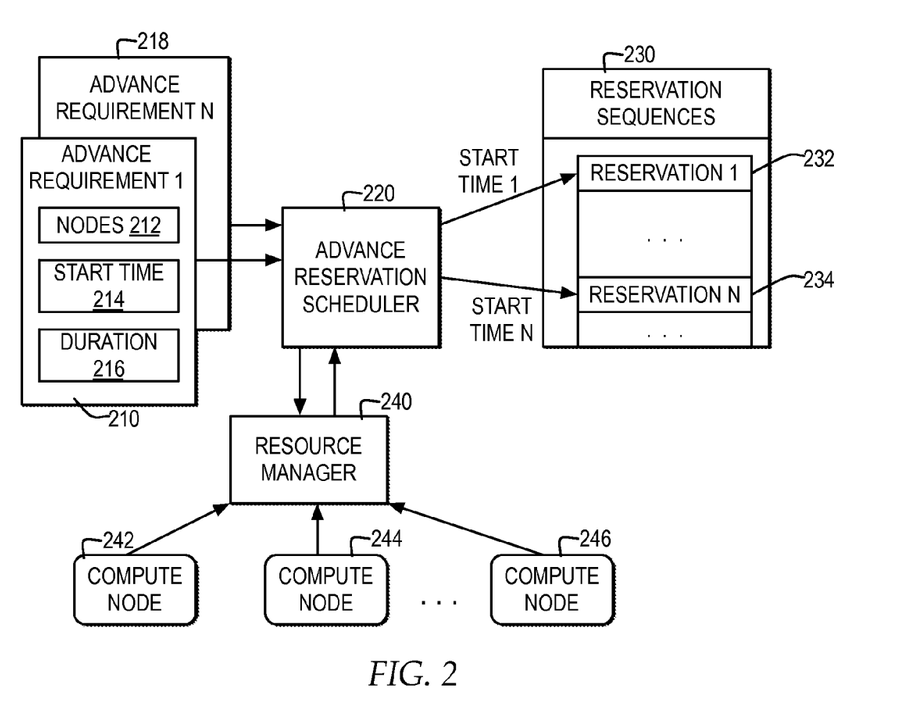
FIG. 2 is a block diagram depicting one example of an advance reservation scheduler for scheduling advance reservations for uninterrupted use of consumable resources from a user specified required start time for a specified duration of time.

FIG. 2 is a block diagram illustrating one example of an advance reservation scheduler for scheduling advance reservations for uninterrupted use of consumable resources from a user specified required start time for a specified duration of time. In the example, an advance reservation scheduler 220 receives advance reservation requirements, such as advance reservation requirement 1 210 and advance reservation requirement N 218, including node requirements, such as nodes 212, specifying the resources required for the advance reservation, a start time, such as start time 214, required for the advance reservation, and a duration, such as duration 216, required for the advance reservation. Advance reservation scheduler 220 communicates with resource manager 240 to determine the availability of one or more compute nodes managed by resource manager 240 to fulfill the nodes, start time, and duration requirements of each advance reservation. For example, as illustrated, resource manager 240 manages compute nodes 242, 244, and 246, which are available for fulfilling advance reservation requests submitted to advance reservation scheduler 220. Those of ordinary skill in the art will appreciate that resource manager 240 may manage additional or alternate compute nodes and that advance reservation scheduler 220 may communicate with additional or alternate resource managers.

If one or more compute nodes are available for the advance reservation to fulfill the nodes, start time, and duration requirements of an advance reservation, then advance reservation scheduler 220 adds the advance reservation to reservation sequences 230, in order of start time, and reserves the available nodes from among compute nodes 242, 244, and 246, for the reservation. For example, advance reservation scheduler 220 adds requirement 1 210 to reservations sequences 230 as illustrated by reservation 1 132 and adds requirement N 218 to reservations sequences 230 as illustrated by reservation N 234. At each start time, advance reservation scheduler 220 activates the advance reservation and directs resource manager 240 to transfer the reserved resources from among compute nodes 242, 244, and 246 to the activated advance reservation for uninterrupted use by jobs bound to the advance reservation for the duration of the reservation. As advance reservation scheduler 220 receives jobs bound to the advance reservation, advance reservation scheduler 220 dispatches the bound jobs to the active advance reservation to run on the compute nodes reserved for the advance reservation.

In one example, advance reservation scheduler 220 receives requirement 1 with nodes 212, start time 214, and duration 216, and advance reservations scheduler 220 determines either that the compute nodes available at start time 214 will not meet the requirement set in nodes 212 or that even if the compute nodes available at start time 214 will meet the requirement set in nodes 212, the available compute nodes are not available for the duration 216 from start time 214. In one example, advance reservation scheduler 220 returns the reservation request to the user without scheduling the reservation, requiring a user to resubmit the reservation request with a different start time or other changes to the requested parameters of the reservation. In the example, advance reservation scheduler 220 will continue to return reservation requests to the user without scheduling the reservation in reservation sequences 230 until the user submits a reservation request for the requested nodes at a start time and for a duration currently available from among compute nodes 242, 244, and 246.

In one example, advance reservation scheduler 220 manages advance reservations for compute nodes, but does not reserve floating resources in advance. The jobs bound to advance reservations, however, may also require floating resources, such as floating resources 110 and 118, when run. When advance reservation scheduler 220 receives jobs bound to an advance reservation for compute node 242, for example, and the bound jobs require floating resources currently running on compute node 244, the jobs bound to the reservation of compute node 242 may have to wait for the floating resources to be available to compute node 242, leaving these jobs sitting idle.

Figure 3:
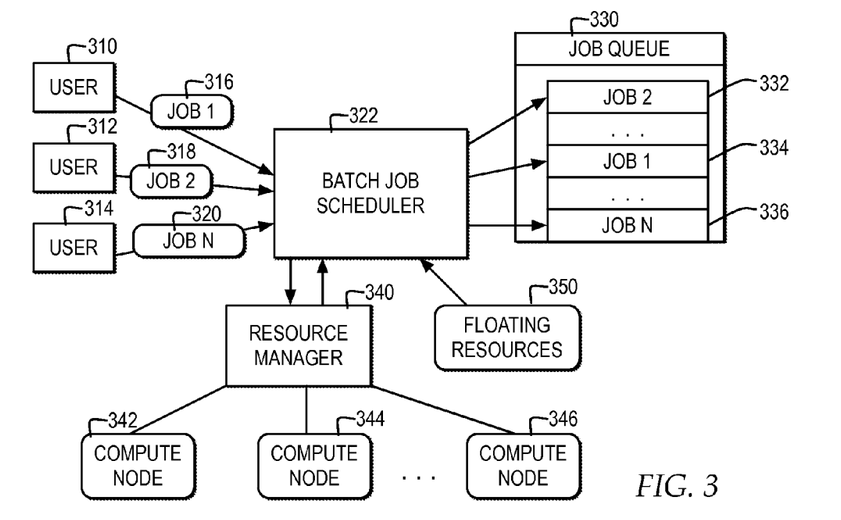
FIG. 3 is a block diagram illustrating one example of a batch job scheduler for scheduling workflow of jobs not bound to a reservation.

FIG. 3 is a block diagram illustrating one example of a batch job scheduler for scheduling workflow of jobs not bound to a reservation. In the example, a batch job scheduler 322 receives job requests from one or more users, such as job 1 316 from user 310, job 2 318 from user 312, and job N 320 from user 314, where each of the job requests is not bound to a reservation. In one example, each job request specifies the consumable resources required for executing the job, the priority level assigned to the job, and other information that allows job scheduler 322 to schedule the job. In another example, job scheduler 322 analyzes a job request to determine all consumable resources required for the job, the priority level for the job, and other information that allows job scheduler 322 to schedule the job.

Job scheduler 322 places each received job in a job queue 330, as illustrated by job 2 332, job 1 334, and job N 336. In one example, job scheduler 322 orders the jobs waiting in job queue 330 according to each job's priority level in comparison with other jobs. For example, job 2 332 has a higher priority level than job 1 334.

Job scheduler 322 considers the highest priority job within job queue 330 that is ready to execute and accounts for one or more factors including, but not limited to, the wall clock time of the job, resources requested by the job, resources available for the job, and currently running jobs that can be preempted. In one example, job scheduler 322 communicates with resource manager 340 to determine whether any of the compute nodes managed by resource manager 340 are available. In addition, job scheduler 322 may maintain a timeline chart of current compute node use and scheduled compute node use.

When job scheduler 322 checks for available compute nodes for the highest priority job waiting in job queue 330 and job scheduler 322 finds a selection of compute nodes matching the required compute nodes for the job, job scheduler 322 instructs resource manager 340 to assign the selection of compute nodes to the job, the job is dispatched to resource manager 340 to run on one or more compute nodes, and job scheduler 322 removes the job from job queue 330.

In addition, as illustrated, job scheduler 322 may schedule the use of floating resources 350 by incoming jobs. In particular, as job scheduler 322 determines whether compute nodes are available for a particular job within job queue 330, job scheduler 322 also determines the availability of consumable resources required for the job from among the shared, floating resources specified as floating resources 350. Job scheduler 322 moves one or more of the floating resources represented as floating resources 350 between compute nodes 342, 344, and 346 as required for jobs to execute on compute nodes 342, 344, and 346.

While job scheduler 322 prioritizes jobs within job queue 330 in order to manage the workflow of a large number of incoming jobs to be scheduled as resources are available from multiple users, job scheduler 322 requires that the user submit jobs that are ready to be run, in contrast to advance reservation scheduler 220, which allows users to submit advance reservation requirements and then submit jobs bound to a scheduled, advance reservation.

Job scheduler 322 does not reject any jobs, in contrast to advance reservation scheduler 220, which rejects any advance reservation requests that cannot be fulfilled at the start time requested by a user. In particular, job scheduler 322 is enabled to accept all jobs because job scheduler 322 schedules jobs according to priority level and job scheduler 322 may allow for preemption of lower priority jobs by pulling a lower priority job from running on compute nodes and placing the job back in job queue 330 so a higher priority job can be dispatched to execute on the same compute nodes, in contrast to advance reservations, which reserve compute nodes for uninterrupted use from a start time, for a specified duration, without preemption.

Figure 4:
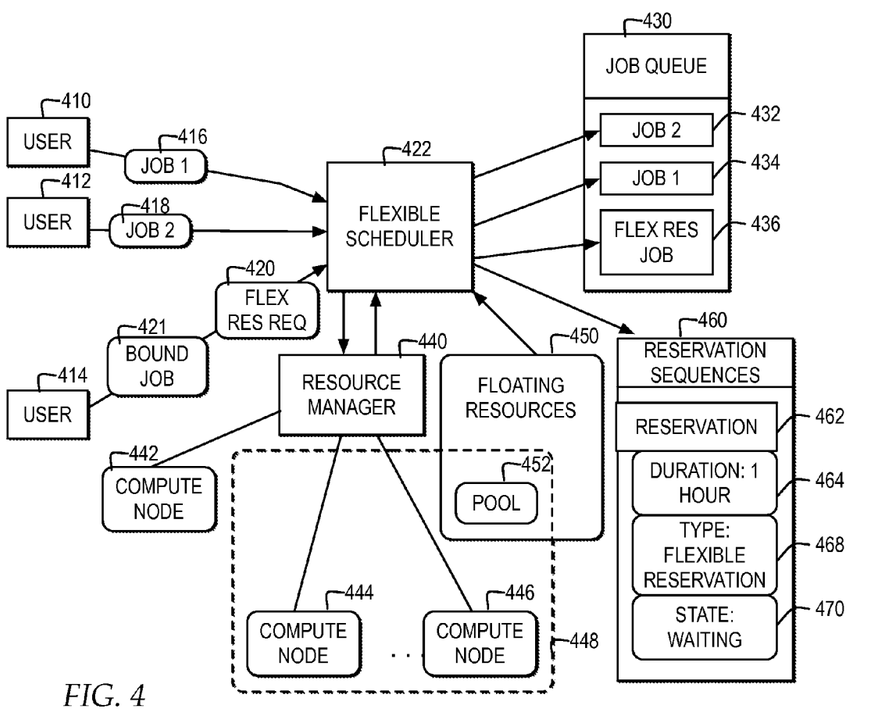
FIG. 4 is a block diagram depicting one example of a flexible job scheduler for scheduling workflow including flexible reservations for uninterrupted use of consumable resources for a duration of time prioritized relative to regular jobs not bound to a reservation.

FIG. 4 is a block diagram illustrating one example of a flexible job scheduler for scheduling workflow including flexible reservations for uninterrupted use of consumable resources for a duration of time prioritized relative to regular jobs not bound to a reservation.

In the example, a flexible scheduler 422 receives regular job requests from one or more users, such as job 1 416 from user 410 and job 2 418 from user 412, where the regular job requests are not bound to a reservation. In addition, flexible scheduler 422 receives flexible reservation requests from one or more users, such as flexible reservation request 420 from user 414. As illustrated, flexible scheduler 422 also receives jobs bound to a reservation, such as a bound job 421 from user 414, where bound job 421 is bound to the reservation requested in flexible reservation request 420. User 414 may submit flexible reservation request 420 and bound job 421 concurrently or separately.

In the example, job 1 416 and job 2 418 represent jobs not bound to a particular reservation that are ready to be dispatched for running when the jobs reach the highest priority position in a job queue 430, when the consumable resources required for executing the jobs become available.

In the example, flexible reservation request 420 specifies a reservation request with a specified duration and at least one required consumable resource. Flexible reservation request 420 requests a flexible reservation of consumable resources as the consumable resources become available, rather than at a particular start time as required by the advance reservation requirements described in FIG. 2. In addition, flexible reservation request 420 is assigned job-like attributes so that the flexible reservation request is prioritized in relation to all other workflow controlled by scheduler 422, but is still a reservation and has uninterrupted use of consumable resources once the reservation is activated.

As flexible scheduler 422 receives job 1 416, job 2 418, flexible scheduler places each job in job queue 430, ordered according to priority level assigned to each job, as illustrated by job 1 434 and job 2 432. As flexible scheduler 422 receives flexible reservation request 420, flexible scheduler 422 creates a flexible reservation (flex res) job for the request specifying the type and amount of consumable resources required and the duration of time for which the consumable resources are needed, such as flex res job 436, and places flex res job 436 in job queue 430. Flexible scheduler 422 prioritizes flex res job 436 within job queue 430 in an order indicating the priority of flex res job 436 relative to the priority of job 1 434 and job 2 432. For purposes of example, as illustrated, flexible scheduler 422 has ordered the jobs in job queue 430 with job 2 432 with the highest priority, job 1 434 with the next priority, and flex res job 436 with the lowest priority. While advance reservation scheduler 220 places only schedulable advance reservation requests with a fixed start time in reservations sequences 230, flexible scheduler 422 accepts all flexible reservation requests, creates a flex res job for each flexible reservation request, and places the flex res job in job queue 430 for prioritization against all other jobs managed by flexible scheduler 422.

Although not depicted, each of job 1 416, job 2 418 and flexible reservation request 420 may include a priority level set with each job or flexible scheduler 422 may prioritize each job according to prioritizing policies applied by flexible scheduler 422, such as prioritizing jobs according to order of receipt, type of job, and job origination. Flexible scheduler 422 may store prioritizing policies locally or may access prioritizing policies from one or more locations via a network connection.

In addition to creating a flex res job for each flexible reservation request received by flexible scheduler 422, upon receipt of flexible reservation request 420, flexible scheduler 422 creates a reservation for flexible reservation request 420 in reservation sequences 460, as illustrated by reservation 462, and sets the state of the reservation to waiting, as illustrated at reference numeral 470, where reservation 462 is waiting for scheduling of nodes to reservation 462 by flexible scheduler 422. Although not depicted, reservation sequences 460 may also include advance reservations scheduled according to start time, as described with reference to FIG. 2, with a state set to scheduled.

For each job within job queue 430, flexible scheduler 422 determines when all the consumable resources required for a job are available. For example, to monitor for resource availability, flexible scheduler 422 maintains a schedule indicating which consumable resources are currently in use and communicates with resource manager 440 and monitors floating resources 450 to determine the actual availability of least one compute node and at least one floating resource required for a job waiting in job queue 430.

In the example of flexible scheduler 422 scheduling a regular job, such as job 1 416 or job 2 418, when flexible scheduler 422 determines the required consumable resources are available for a regular job, flexible scheduler 422 assigns the required shared resources from floating resources 450 to one or more compute nodes from among compute nodes 442, 444, and 446, removes the job from job queue 430 and dispatches the job to resource manager 440 to run on the available compute nodes.

In the example of flexible scheduler 422 scheduling a flex res job, such as flex res job 436, when flexible scheduler 422 determines the required consumable resources are available for a reservation specified by flex res job 436, flexible scheduler 422 removes flex res job 436 from job queue 430 without sending flex res job 436 to resource manager 440, assigns the available consumable resources to reservation 462, and activates reservation 462, setting state 470 to active. In assigning consumable resources to reservation 462, flexible scheduler 422 reserves one or more compute nodes from among compute nodes 442, 444, and 446 for the reservation and moves one or more floating resources from floating resources 450 to the reserved compute nodes. In one example, a selection of consumable resources 448 is reserved for reservation 462, including compute node 444, compute node 446 and a selection of floating resources 450 identified by pool 452. As flexible scheduler 422 receives jobs bound to the flexible reservation, such as bound job 421, flexible scheduler 422 dispatches the jobs directly to the active reservation, rather than placing the jobs in job queue 430 and rather than passing the jobs to resource manager 440 first, as with regular jobs. In another example, a selection of floating resources 450 identified by pool 452 may be moved to the reserved compute nodes as the selection of floating resources becomes available, such that the floating resources are not required to be reserved, but are provided as soon as possible to the reserved compute nodes.

Both advance reservations, as described in FIG. 2, and flexible reservations, require compute nodes that will be assigned to the reservation for a certain period of time for executing certain jobs without interruption. In contrast, job 1 416 and job 2 418, even after dispatched to compute nodes 442, 444, or 446, may preempted by flexible scheduler 422 while executing and returned to job queue 430, to free up consumable resources for an incoming job with a higher priority than job 1 416 and job 2 418, including a higher priority flexible res job. In particular, once flexible scheduler 422 detects state 470 of reservation 462 set to "active", flexible scheduler 422 will not allow reservation 462 to be preempted.

By allowing flexible reservation requests to leverage flexible scheduler 422, flexible reservation requests acquire consumable resources at the first available time the consumable resources are available, flexible reservation requests compete for consumable resources with regular jobs, high priority flexible reservation requests preempt low priority workload, flexible reservation requests and regular jobs are scheduled according to priority relative to one another, flexible reservation requests acquire floating resources with the reservation of compute nodes, and flexible reservation requests still have uninterrupted use of assigned consumable resources once the reservation becomes active. By assigning flexible reservation requests job-like attributes and scheduling flexible reservations from the same job queue as regular jobs, flexible reservation requests will be pending in job queue 430 until all higher priority workload, whether other reservations or regular jobs, have been scheduled. In addition, by assigning flexible reservation requests job-like attributes and scheduling flexible reservations from the same job queue as regular jobs, flexible reservation requests, like regular jobs, will not be rejected.

One difference between the advance reservations described in FIG. 2 and flexible reservations, is that advance reservations require a start time, however flexible scheduler 422 receives flexible reservation request 420 specifying a flexible reservation to be scheduled as resources become available, such that flexible scheduler 422 reserves resources for the flexible reservation as the resources become available, rather than in advance, at a required start time. With flex res job 420, user 414 does not have to continually guess at an available start time for the flexible reservation requested as described with reference to the advance reservations in FIG. 2, but user 414 is able to reserve resources for uninterrupted use for a duration by jobs bound to the flexible reservation.

In another difference between the advance reservations described in FIG. 2 and flexible reservations, both types of reservations may require the use of floating resources, however advance reservations may not provide for reservation of floating resources, while flexible reservations do include the option for a user to request floating resources and receive reserved floating reservations. In one example, a job bound to a reservation may require a certain number of software licenses to run, where the software licenses are available from floating resources 450. If the job is bound to an advance reservation, when the job arrives at the reserved compute nodes, while the machines required for running the job may be available, the job will be competing with other workload for floating resources and may have to wait until other workload on other machines release the required software licenses to run the job. In contrast, if the job is bound to a flexible reservation that reserves floating resources with machines in compute nodes, when the job arrives at the reserved compute nodes, the job will consume floating resources from within the flexible reservation's pool 452 and will not have to compete with other workload for floating resources. In another example, a flexible reservation request that does not specifically require a reservation of floating resources will still receive the floating resources as soon as they are available.

In another difference between the advance reservations described in FIG. 2 and flexible reservations, advance reservations are accepted and scheduled separately from other jobs, however flexible scheduler 422 creates a flex res job for a flexible reservation and flex res jobs that are prioritized against all other jobs by flexible scheduler 422. By prioritizing flex res jobs with all other jobs, a computing environment supports reservations of resources, but treats both regular jobs and reservations on an "as available" basis and allows prioritization of flexible reservation requests against all other jobs and other flexible reservation requests.

Figure 5:
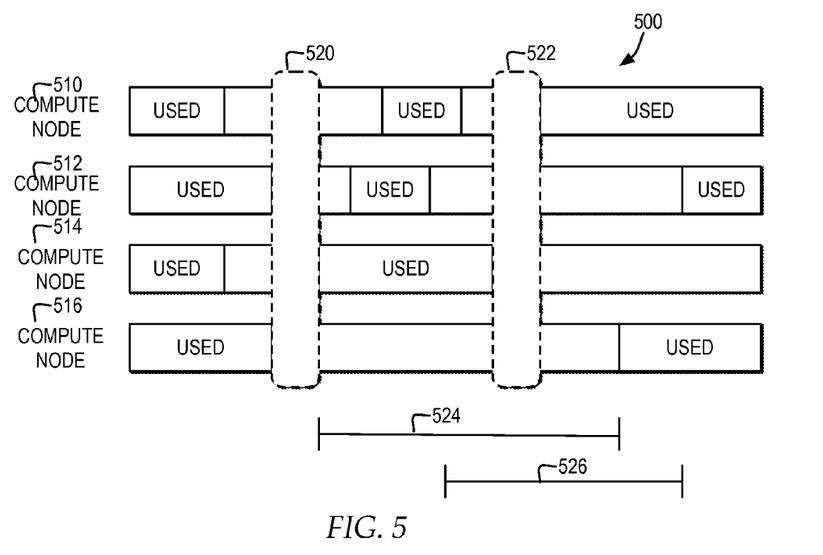
FIG. 5 is a block diagram illustrating one example of a scheduling timeline for compute nodes of a computing environment managed by a flexible scheduler.

With reference now to FIG. 5, a block diagram illustrates one example of a scheduling timeline for compute nodes of a computing environment managed by a flexible scheduler. In the example, scheduling timeline 500 illustrates times when each of compute nodes 510, 512, 514, and 516 are used and not used. In the example, flexible scheduler 422 manages the use of compute nodes 510, 512, 514, and 516 and manages the scheduling of regular jobs and flex res jobs from a prioritized job queue to compute nodes 510, 512, 514, and 516.

In one example, flexible scheduler 422 monitors the availability of compute nodes 510, 512, 514, and 516 for scheduling each of the jobs illustrated in job queue 430, including flex res job 436. As flexible scheduler 422 schedules the use of compute nodes over 510, 512, 514, and 516 over time, flexible scheduler 422 determines when compute nodes 510, 512, 514, and 516 are all available for a particular duration of time specified for flex res job 436 and schedules compute nodes 510, 512, 514, and 516 for assignment to reservation 462 during the available time.

In one example, as flexible scheduler 422 monitors the availability of compute nodes 510, 512, 514, and 516 for the particular duration specified for flex res job 436, flexible scheduler 422 determines that compute nodes 510, 512, 514, and 516 are available for the particular duration for flex res job 436 during a time period 520 and may schedule compute nodes 510, 512, 514, and 516 for time period 520 for reservation 462. By scheduling the reservation of compute node 510, 512, 514, and 516 on as "as available" basis for flexible reservation 462, flexible scheduler 422 is able to determine that the required consumable resources for the reservation are available during time period 520. In contrast, if compute nodes 510, 512, 514, and 516 were managed by advance reservation scheduler 220 rather than flexible scheduler 422, the user would be required to guess at a start time and submit an advance reservation request with a start time matching the start time of time period 520, in order to most efficiently use compute nodes 510, 512, 514, and 516 as they become available, as illustrated. In addition, in contrast, if compute nodes 510, 512, 514, and 516 were managed by advance reservation scheduler 220 rather than flexible scheduler 422, if the user scheduled an advance reservation with a start time matching the start time of time period 522, the advance reservation would be scheduled, however compute node 516 may remain unused for a time period 524 and compute node may remain unused for a time period 526, even though other jobs are waiting and would be able to use these compute nodes during time periods 524 and 526, because the advance reservation blocks out the use of these compute nodes during time period 522.

In another example, as flexible scheduler 422 monitors the availability of compute nodes 510, 512, 514, and 516 for the particular duration specified for flex res job 436, flexible scheduler 422 also manages the scheduling of compute nodes for the flexible reservation specified by flex res job 436 in view of the priority levels of other jobs within job queue 430. In one example, while flexible scheduler 422 may determine that compute nodes 510, 512, 514, and 516 are available for time period 520 to satisfy the duration and node requirements of flex res job 436, flexible scheduler 422 may determine that another job, such as job 2 323 in job queue 430, has a higher priority than flex res job 436 and flexible scheduler 422 may dispatch job 2 432 to compute nodes 510, 512, 514, and 516 during time period 520 and then monitor for the next available time when compute nodes 510, 512, 514, and 516 are available for the duration specified for flex res job 436, such as time period 522. In one example, since flexible reservations require the uninterrupted use of compute nodes, but flexible scheduler 422 may interrupt use of compute nodes by regular jobs, to most efficiently schedule use of compute nodes, flexible scheduler 422 may prioritize a regular job that uses a single compute node and can be preempted if a higher priority job comes in, above a flex res job that requires uninterrupted use of multiple nodes for a duration of time for the flexible reservation.

Figure 6:
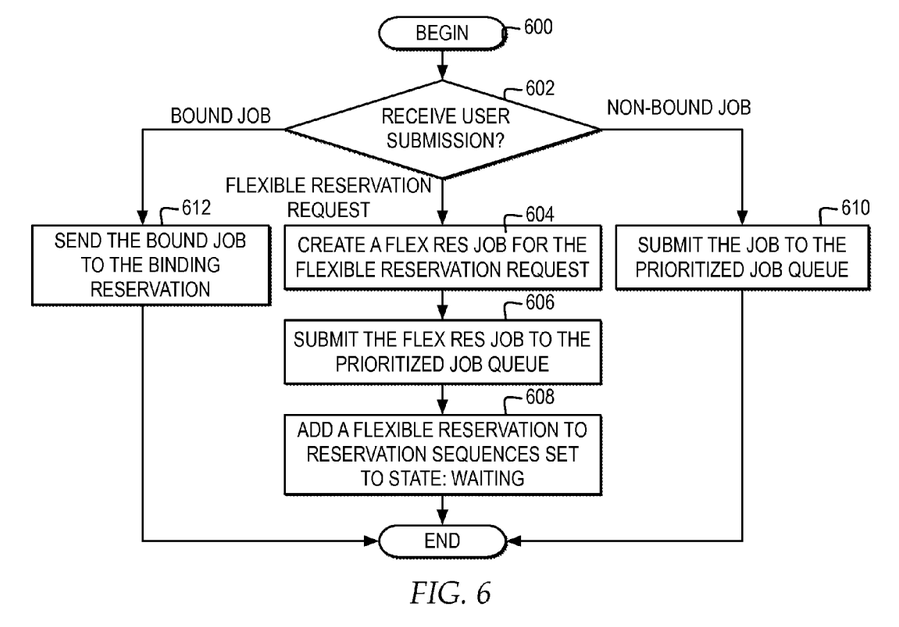
FIG. 6 is a block diagram depicting one example of a high-level logic flowchart for managing handling of user submissions by a flexible scheduler.

With reference now to FIG. 6, a block diagram illustrates one example of a high-level logic flowchart for managing handling of user submissions by a flexible scheduler. In the example, the process starts at block 600 and thereafter proceeds to block 602. Block 602 illustrates a determination that a user submission is received.

At block 602, if the user submission received by the flexible scheduler is a non-bound job, the process passes to block 610. Block 610 illustrates submitting the job to the prioritized job queue, and the process ends. At block 602, if the user submission received by the flexible scheduler is a bound job, the process passes to block 612. Block 612 depicts sending the bound job to the binding reservation, and the process ends.

In addition, at block 602, if the user submission received by the flexible scheduler is a flexible reservation request, the process passes to block 604. Block 604 depicts creating a flex res job for the flexible reservation request. Next, block 606 illustrates submitting the flex res job to the prioritized job queue. Thereafter, block 608 depicts adding a flexible reservation to the reservations sequences, set to a state of "waiting", and the process ends.

Figure 7:
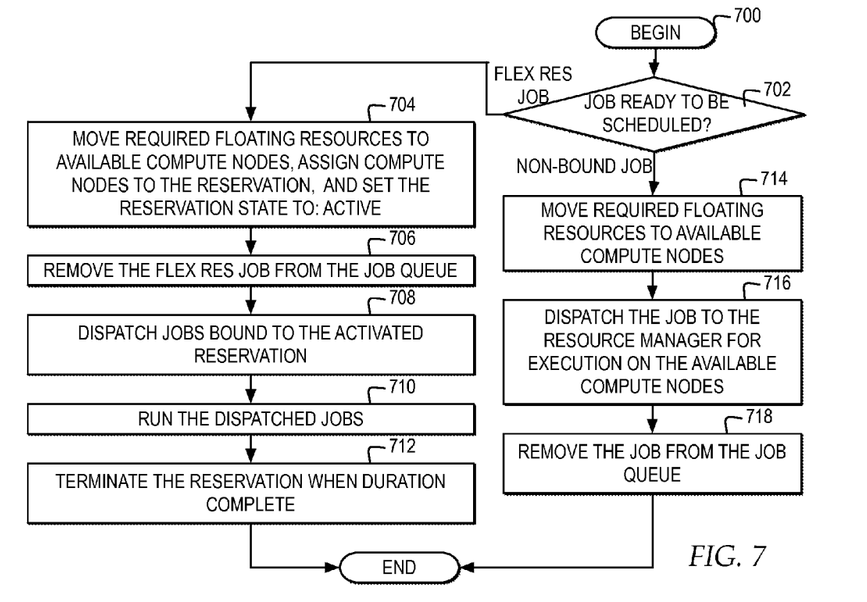
FIG. 7 is a block diagram illustrating one example of a high level logic flowchart for scheduling jobs and handling scheduled jobs, by a flexible scheduler.

Referring now to FIG. 7, a block diagram depicts one example of a high-level logic flowchart for scheduling jobs and handling scheduled jobs, by a flexible scheduler. In the example, the process starts at block 700 and thereafter passes to block 702. Block 702 illustrates a determination that a job is ready to be scheduled.

At block 702, if the job ready to be scheduled is a regular, non-bound job, then the process passes to block 714. Block 714 depicts moving required floating resources to the computing nodes available for the job. Next, block 716 illustrates dispatching the job to the resource manager to run on the available compute nodes. Thereafter, block 718 depicts removing the job from the job queue, and the process ends.

In addition, at block 702, if the job ready to be scheduler is a flex res job, then the process passes to block 704. Block 704 depicts moving required floating resources to compute nodes available for the flexible reservation, assigning the compute nodes to the reservation, and activating the reservation. In an alternate embodiment, floating resources may be moved to the compute nodes as the floating resources become available, such that the floating resources are not required to be reserved.

Next, block 706 illustrates removing the flex res job from the job queue. Thereafter, block 708 depicts dispatching jobs bound to the activated reservation to the assigned compute nodes. Next, block 710 illustrates running the dispatched jobs. Thereafter, block 712 depicts terminating the reservation when the scheduled duration of the reservation is complete, and the process ends.

Figure 8:
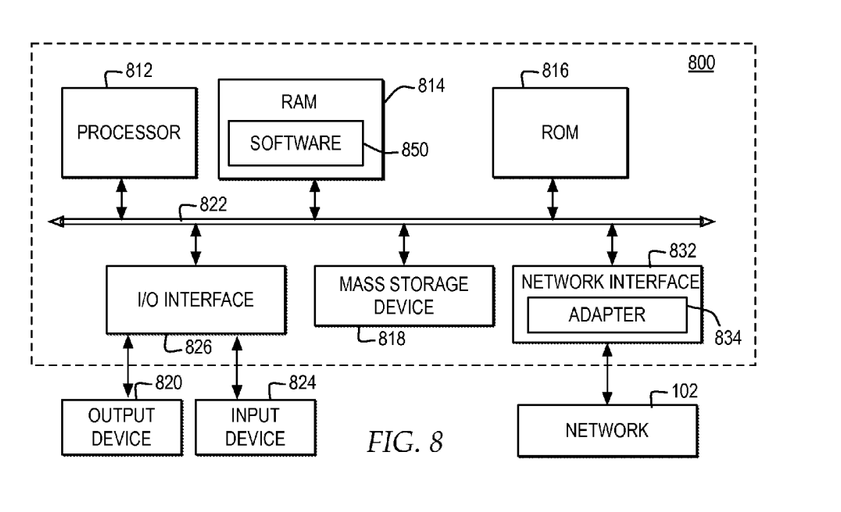
FIG. 8 is a block diagram depicting one example of a computer system in which the present invention may be implemented.

With reference now to FIG. 8, a block diagram illustrates one example of a computer system in which the present invention may be implemented. The present invention may be performed in a variety of systems and combinations of systems, made up of functional components, such as the functional components described with reference to computer system 800 and may be communicatively connected to a network, such interconnection network 102. As described herein, one or more functional components of computer system 800 may represent a node, such as one of compute nodes 112, 114, and 116, a floating resource, such as floating resources 110 and 118, or a scheduler, such as scheduler 120. In addition, as described herein, a grouping of multiple instances of one or more functional components of computer system 800 may represent a compute node, such as one of nodes 112, 114, and 116, a floating resource, such as floating resources 110 and 118, or a scheduler, such as scheduler 120.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power. Where multiple processors share bus 822, additional controllers (not depicted) for managing bus access and locks may be implemented.

Processor 812 may be at least one general-purpose processor such as IBM's PowerPC (PowerPC is a registered trademark of International Business Machines Corporation) processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, applications, protocols, licenses, interfaces, and processes for controlling one or more systems within a network including, but not limited to, an adapter, a switch, a cluster system, and a grid environment.

In one embodiment, the operations performed by processor 812 may control the operations of flowchart of FIGS. 6 and 7 and other operations described herein. Operations performed by processor 812 may be requested by software 850 or other code or the steps of the present invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 818, a random access memory (RAM), such as RAM 814, a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 800, partly on the user's computer, as a stand-alone software package, partly on the user's computer and partly on a remote computer or entirely on the remote computer or server. In the latter scenario, the remote computer may be connected to the user's computer through any type of network, such as interconnection network 102, through a communication interface, such as network interface 832, over a network link that may be connected, for example, to interconnection network 102.

In the example, network interface 832 includes an adapter 834 for connecting computer system 800 to interconnection network 102 through a link. Although not depicted, network interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

The present invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 800, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 800, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 832, the network link to interconnection network 102, and interconnection network 102 may use electrical, electromagnetic, or optical signals that carry digital data streams. The signals through the various networks and the signals on interconnection network 102, the network link to interconnection network 102, and network interface 832 which carry the digital data to and from computer system 800, may be forms of carrier waves transporting the information.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, an output device 820 communicatively enabled on bus 822 via I/O interface 826 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 8 may vary. Furthermore, those of ordinary skill in the art will appreciate that the depicted example is not meant to imply architectural limitations with respect to the present invention.

Figure 9:
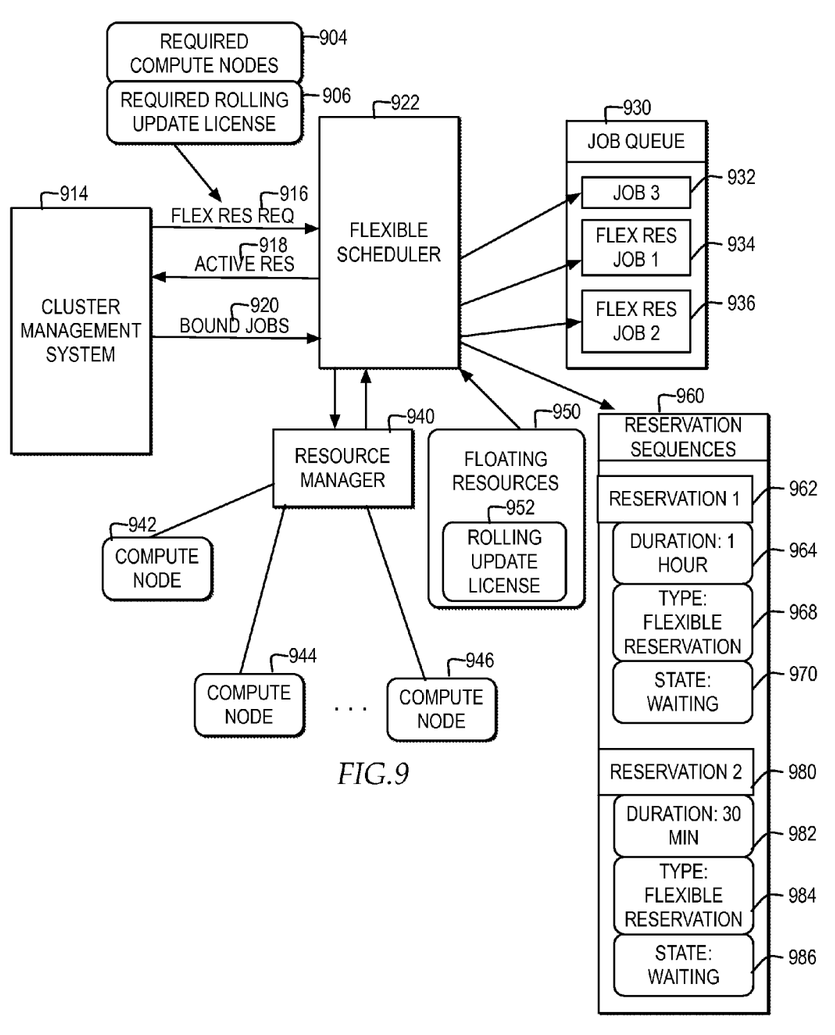
FIG. 9 is a block diagram illustrating one example of a cluster management system sending multiple flexible reservation requests for scheduling software updates on a system.

With reference now to FIG. 9, a block diagram illustrates one example of a cluster management system sending multiple flexible reservation requests for scheduling software updates on a system.

In the example, a cluster management system 914 manages routine software updates by periodically sending sends multiple flexible reservation requests (flex res req) to flexible scheduler 922 as illustrated at reference numeral 916. Each flexible reservation request specifies a list of compute nodes required to be reserved for the reservation, as illustrated at reference numeral 904. For example, each flexible reservation request specifies a list of compute nodes required for the reservation from among compute nodes 942, 944, and 946. In addition, each flexible reservation request specifies a required rolling update license, as illustrated at reference numeral 906.

As described with reference to flexible scheduler 422 of FIG. 4, flexible scheduler 922 also receives regular jobs and flexible reservation requests. Flexible scheduler 922 schedules regular jobs in job queue 930, such as job 3 illustrated at reference numeral 932. Flexible scheduler 922 creates a flex res job for each flexible reservation request and places the flex res job in job queue 930, such as flex res job 1 illustrated at reference numeral 934 and flex res job 2 illustrated at reference numeral 936. In addition, flexible scheduler 922 adds a reservation for each flexible reservation request to reservation sequences 960, such as reservation 1 illustrated at reference numeral 962, with a duration 964, type 968, and state 970, and reservation 2 illustrated at reference numeral 980, with a duration 982, type 984, and state 986.

In the example, a rolling update license, as required as illustrated at reference numeral 906, represents a floating resource. For example, floating resources 950 include a rolling update license 952. Accessing the rolling update license allows cluster management system 914 to control the number of software update operations occurring in parallel, leaving sufficient compute nodes for normal workload operations.

In one example, flexible scheduler 922 notifies cluster management system 914 when the state of one of the reservations among reservation sequences 960 changes from "waiting" to "active" by sending an active reservation update (active res) 918. Cluster management system 914, upon receiving an indicator that one of the software update reservations is activated, sends bound jobs 920 to install new software or upgrade existing software on the reserved compute nodes, reconfigure the reserved compute nodes, and reboot the reconfigured nodes, if necessary. When cluster management system 914 finishes updating software through a reservation, cluster management system 914 may request flexible scheduler 922 remove the reservation, triggering flexible scheduler 922 to return updated compute nodes to resource manager 940.

By performing software upgrades using flexible reservations requiring rolling update licenses, cluster management system 914 performs rolling software updates as part of daily operations, as consumable resources become available. Rolling software updates scheduled through flexible reservations control the number of software update operations occurring in parallel to keep the system infrastructure always running required levels of software, while also minimizing system maintenance downtime by performing software upgrades as the required compute nodes become available and prioritized against other jobs and flexile reservation requests. In one example, cluster management system 914 may submit a first flexible reservation request with a required rolling license for compute node 942 and a second flexible reservation request with a required rolling license for compute nodes 944 and 946, where flexible scheduler 422 will only activate one of the reservations with a required rolling license at a time, as the compute nodes become available and as rolling update license 952 becomes available, to effectively manage rolling software updates with minimal system maintenance downtime and while running required levels of software on the system infrastructure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A system for managing workflow, comprising:
   a scheduler operative to schedule use of a computing environment comprising a plurality of consumable resources comprising at least one machine resource and at least one floating resource;
   the scheduler operative to specify a rolling update license for the at least one floating resource, wherein the scheduler accesses the rolling update license to control a number of software update operations enabled to occur in parallel on the at least one floating resource;
   the scheduler operative to receive a plurality of flexible reservation requests for scheduling in the computing environment, wherein each of the plurality of flexible reservation requests specifies a duration, at least one required machine resource, and a required rolling update license;
   the scheduler operative to create a separate flexible job for each of the plurality of flexible reservation requests and placing each separate flexible job in a prioritized job queue comprising a plurality of flexible jobs for scheduling;

the scheduler operative to add a separate reservation of a plurality of reservations each set to a waiting state for each of the plurality of flexible reservation requests;

the scheduler operative to only allow activation of one reservation at a time from among the plurality of reservations;

the scheduler, responsive to detecting a particular flexible job from among the plurality of flexible jobs positioned in the prioritized job queue for scheduling next and detecting a selection of the plurality of consumable resources comprising the rolling update license available to match the at least one required machine resource and the required rolling update license for the duration and detecting that no other reservation comprising the rolling update license is currently active from among the plurality of reservations, operative to transfer the selection of the plurality of consumable resources to the one reservation and setting the one reservation to an active state, wherein the one reservation is activated as the selection of the plurality of consumable resources become available and has uninterrupted use of the selection of the plurality of consumable resources for the duration for at least one bound job to the reservation;

the scheduler operative to send an update to a cluster management system indicating the one reservation is active;

the scheduler operative to receive, from the cluster management system, the at least one job bound to the one reservation for upgrading at least one software element within the plurality of consumable resources; and the scheduler operative to dispatch the at least one job bound to the one reservation to the one reservation to update the at least one software element, reconfigure the plurality of consumable resources, and remove the reconfigured plurality of consumable resources.

2. The system according to claim 1, further comprising:
the scheduler operative to prioritize each of the plurality of flexible jobs within the prioritized job queue in a position relative in priority to at least one regular job, wherein each of the plurality of flexible jobs and the at least one regular job within the prioritized job queue waits in the prioritized job queue until scheduled by the scheduler in order of priority.

3. The system according to claim 1, further comprising:
the scheduler, responsive to receiving the at least one bound job for the one reservation, operative to dispatch the at least one bound job directly to the one reservation for running on the selection of plurality of consumable resources without placement in the prioritized job queue.

4. The system according to claim 1, further comprising:
the scheduler operative to move the at least one floating resource to at least one compute node comprising the at least one machine resource of the selection of the plurality of consumable resources, wherein the at least one floating resource further comprises at least one of a shared cluster resource from among computational network bandwidth, input/output network bandwidth, at least one token, and at least one software license and wherein the at least one machine resource further comprises at least one of at least one processor, memory, at least one disk drive, and at least one communication adapter.

5. The system according to claim 1, further comprising:
the scheduler operative to configure the plurality of consumable resources in a cluster managed by the scheduler.

6. The system according to claim 1, further comprising:
the scheduler, responsive to setting the one reservation to an active state, operative to remove the particular flexible job from the prioritized job queue.

7. A computer program product for managing workflow, said computer program product tangibly embodied in a computer-readable storage medium and comprising computer executable instructions which cause a computer to:

receive, by a scheduler, a plurality of flexible reservation requests for scheduling in a computing environment comprising a plurality of consumable resources, wherein each of the flexible reservation requests specifies a duration, at least one required machine resource, and a required rolling update license, wherein the plurality of consumable resources comprises at least one machine resource and at least one floating resource, wherein a rolling update license is specified for the at least one floating resource, wherein the scheduler accesses the rolling update license to control a number of software update operations enabled to occur in parallel on the at least one floating resource;

create, by the scheduler, a separate flexible job for each of the plurality of flexible reservation requests and place each separate flexible job in a prioritized job queue comprising a plurality of flexible jobs for scheduling;

add a separate reservation of a plurality of reservations each set to a waiting state for each of the plurality of flexible reservation requests, wherein the scheduler only allows activation of one reservation at a time from among the plurality of reservations;

responsive to detecting a particular flexible job from among the plurality of flexible jobs positioned in the prioritized job queue for scheduling next and detecting a selection of the plurality of consumable resources comprising the rolling update license available to match the at least one required machine resource and the required rolling update license for the duration and detecting that no other reservation comprising the rolling update license is currently active from among the plurality of reservations, transfer the selection of the plurality of consumable resources to the one reservation and setting the one reservation to an active state, wherein the one reservation is activated as the selection of the plurality of consumable resources become available and has uninterrupted use of the selection of the plurality of consumable resources for the duration for at least one bound job to the reservation;

send an update to a cluster management system indicating the one reservation is active;

receive, from the cluster management system, the at least one job bound to the one reservation for upgrading at least one software element within the plurality of consumable resources; and dispatch the at least one job bound to the one reservation to the one reservation to update the at least one software element, reconfigure the plurality of consumable resources, and remove the reconfigured plurality of consumable resources.

8. The computer program product according to claim 7, further comprising computer executable instructions which cause a computer to:

prioritize each of the plurality of flexible jobs within the prioritized job queue in a position relative in priority to at least one regular job, wherein each of the plurality of flexible jobs and the at least one regular job within the prioritized job queue waits in the prioritized job queue until scheduled by the scheduler in order of priority.

* * * * *